US012679962B2

(12) United States Patent
Cavalieri

(10) Patent No.: US 12,679,962 B2
(45) Date of Patent: Jul. 14, 2026

(54) POLYOLEFIN COMPOSITIONS OBTAINED FROM RECYCLED POLYOLEFINS

(71) Applicant: Basell Poliolefine Italia S.r.l., Milan (IT)

(72) Inventor: Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 664 days.

(21) Appl. No.: 18/037,942

(22) PCT Filed: Nov. 15, 2021

(86) PCT No.: PCT/EP2021/081614
§ 371 (c)(1),
(2) Date: May 19, 2023

(87) PCT Pub. No.: WO2022/112029
PCT Pub. Date: Jun. 2, 2022

(65) Prior Publication Data
US 2024/0010823 A1      Jan. 11, 2024

(30) Foreign Application Priority Data

Nov. 26, 2020      (EP) .................................... 20209952

(51) Int. Cl.
C08L 23/12      (2006.01)

(52) U.S. Cl.
CPC ........... C08L 23/12 (2013.01); C08L 2205/03 (2013.01); C08L 2207/20 (2013.01)

(58) Field of Classification Search
CPC .............. C08L 23/12; C08L 2205/025; C08L 2205/035; C08L 2207/20; C08L 2310/00; C08L 23/10; C08L 23/0815; C08L 23/14; C08L 53/00; C08K 3/36; C08K 2201/005; C08K 3/34
See application file for complete search history.

(56) References Cited

U.S. PATENT DOCUMENTS

| | | |
|---|---|---|
| 4,399,054 A | 8/1983 | Ferraris et al. |
| 4,469,648 A | 9/1984 | Ferraris et al. |
| 4,522,930 A | 6/1985 | Albizzati et al. |
| 5,030,662 A | 7/1991 | Banerjie |
| 5,286,791 A | 2/1994 | DeNicola, Jr. et al. |
| 5,338,801 A | 8/1994 | Eppert, Jr. |
| 2011/0305886 A1 | 12/2011 | Phan et al. |
| 2014/0288228 A1* | 9/2014 | Mehta ..................... C08L 23/14 |
| | | 525/240 |
| 2021/0040307 A1* | 2/2021 | Zhang ................. B29C 45/0001 |

| | | | |
|---|---|---|---|
| 2022/0145054 A1* | 5/2022 | Essers ..................... C08L 23/12 |
| 2023/0383109 A1* | 11/2023 | Cavalieri ................. C08K 3/36 |
| 2023/0383110 A1* | 11/2023 | Cavalieri ................. C08L 23/10 |

FOREIGN PATENT DOCUMENTS

| | | |
|---|---|---|
| CN | 107849413 A | 3/2018 |
| CN | 109790344 A | 5/2019 |
| CN | 110546198 A | 12/2019 |
| EP | 45977 A2 | 2/1982 |
| EP | 2669329 A1 | 12/2013 |
| EP | 3371255 A1 | 9/2018 |
| JP | H05105788 A | 4/1993 |
| JP | 2006045407 A | 2/2006 |
| JP | 2015193831 A | 11/2015 |
| JP | 201775209 A | 4/2017 |
| JP | 2020-128032 A | 8/2020 |
| JP | 2021-143234 A | 9/2021 |
| WO | 0063261 A1 | 10/2000 |
| WO | 0157099 A1 | 8/2001 |
| WO | 03040201 A1 | 5/2003 |
| WO | 2007071494 A1 | 6/2007 |
| WO | 2019173299 A1 | 9/2019 |

OTHER PUBLICATIONS

English translation JP2015193831A (Year: 2015).*
Abel Zuniga; Impact Resistance Improvement on Modified Recycled PP Using SBS and SEBS Elastomers, Plastics Engineering, vol. 72, No. 1, Jan. 1, 2016, pp. 36-37, XP002802663.
The International Search Report and The Written Opinion for PCT/EP2021/081614 mailed Feb. 10, 2022.
Shimojo et al., Development of the p. Materials by Using New Compatibilyzing Technology for Automotive Parts, Sumitomo Chemical: Technical Journal, No. 2002, pp. 50-55, URL:https://www.sumitomo—chem.co.jp/rd/report/2002/, https://www.sumitomo—chem.co.jp/rd/report/files/docs/20020206_849.pdf.
Oka, Plastic Recycling Status and Goals, Journal of Japan Institute of Light Metals, vol. 46, No. 11, 1996, pp. 537-543, URL:https://doi.org/10.2464/jilm.46.537.
Masaki, Recycling of Plastic Debris, Resources and Materials, vol. 113, No. 12, 1997, pp. 1005-1009, URL:https://doi.org/10.2473/shigentosozai.113.1005.

* cited by examiner

*Primary Examiner* — Alicia Bland

(57) ABSTRACT

A polypropylene composition made from or containing (a) from 45 to 90 wt % of a propylene polymer optionally containing up to 7 wt % of ethylene, based upon the total weight of the propylene polymer, and having a melt flow rate (ISO 1133 230° C./2.16 kg) ranging from 0.5 to 5 g/10 min; and (b) from 10 to 55 wt % of a multicomponent recycled composition containing (b1) at least 70 wt % by weight of a propylene polymer containing from 1 to 7 wt % of ethylene, based upon the total weight of the propylene polymer and (b2) from 5 to 30 wt % of a styrenic block copolymer (SBC).

15 Claims, No Drawings

POLYOLEFIN COMPOSITIONS OBTAINED FROM RECYCLED POLYOLEFINS

This application is the U.S. National Phase of PCT International Application PCT/EP2021/081614, filed Nov. 15, 2021, claiming benefit of priority to European Patent Application No. 20209952.9, filed Nov. 26, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to compositions made from or containing recycled polypropylene.

BACKGROUND OF THE INVENTION

Polyolefins are consumed for applications, including packaging for food and other goods, fibers, automotive components, and manufactured articles. The quantity of polyolefins raises concerns for the environmental impact of the waste materials generated after the first use.

Waste plastic materials are coming from differential recovery of municipal plastic wastes. In some instances, municipal waste includes flexible packaging (cast film, blown film and BOPP film), rigid packaging, blow-molded bottles, and injection-molded containers. Through a step of separation from other polymers, polyolefin fractions are obtained. The polyolefin fractions include polyethylene and polypropylene polymers. In some instances, the polyethylene polymers are HDPE, LDPE, or LLDPE. In some instances, the polypropylene polymers are homopolymers, random copolymers, or heterophasic copolymers.

In some instances, the multicomponent nature of the recycled material results in poor mechanical and optical performances of the polyolefin formulations, wherein the recycled polymer partially replaces the virgin polymer.

SUMMARY OF THE INVENTION

In a general embodiment, the present disclosure provides a polypropylene composition made from or containing:
(a) from 45 to 90 wt % of a propylene polymer optionally containing up to 7 wt % of ethylene, based upon the total weight of the propylene polymer, and having a melt flow rate (ISO 1133 230° C./2.16 kg) ranging from 0.5 to 5 g/10 min; and
(b) from 10 to 55 wt % of a recycled composition containing
(b1) at least 70 wt % of a propylene polymer containing from 1 to 7 wt % of ethylene, based upon the total weight of the propylene polymer;
(b2) from 5 to 30 wt % of a styrenic block copolymer (SBC) and, optionally,
(b3) from 1 to 5 wt % of an ethylene homopolymer or copolymer containing up to 30 wt % of a $C_3$-$C_{10}$ alpha olefin, based upon the total weight of the ethylene copolymer, wherein (a) and (b) are based upon the total weight of the polypropylene composition and wherein (b1), (b2), and (b3) are based upon the total weight of the recycled composition (b).

DETAILED DESCRIPTION OF THE INVENTION

As used herein, the term "copolymer" refers to both polymers with two different recurring units and polymers with more than two different recurring units, such as terpolymers, in the chain. As used herein, the term "ambient temperature" refers to a temperature of about 25° C. (room temperature).

As used herein, the term "consisting essentially of" refers to, in connection with a polymer or polymer composition made from or containing mandatory components, the polymer or polymer composition optionally further having other components present, provided that the essential characteristics of the polymer or polymer composition are not materially affected by the presence of the other components. In some embodiments, components that do not materially affect characteristics of the polymer or polymer composition are selected from the group consisting of catalyst residues, antistatic agents, melt stabilizers, light stabilizers, antioxidants, and antiacids.

As used herein, the term "crystalline polypropylene" refers to a propylene polymer having an amount of isotactic pentads (mmmm), measured by $^{13}C$-MNR on the fraction insoluble in xylene at 25° C., higher than 70 molar %. As used herein, the term "elastomeric" polymer refers to a polymer having solubility in xylene at ambient temperature higher than 50 wt %.

In some embodiments, the present disclosure provides a polypropylene composition made from or containing, alternatively consisting essentially of:
(a) from 45 to 90 wt %, alternatively 50 to 85 wt %, alternatively 55-80 wt %, of a propylene polymer optionally containing up to 7 wt % of ethylene, based upon the total weight of the propylene polymer, and having a melt flow rate (ISO 1133 230° C./2.16 kg) ranging from 0.5 to 5 g/10 min; and
(b) from 10 to 55 wt %, alternatively 15 to 50 wt %, alternatively 20 to 45 wt %, of a recycled composition containing:
(b1) at least 70 wt %, alternatively from 75 to 90 wt %, of a propylene polymer containing from 1 to 7 wt % of ethylene, based upon the total weight of the propylene polymer;
(b2) from 5 to 30 wt %, alternatively 7 to 25 wt %, of a styrenic block copolymer (SBC) and, optionally,
(b3) from 1 to 5 wt %, alternatively 2 to 4 wt %, of an ethylene homopolymer or copolymer containing up to 30 wt % of a $C_3$-$C_{10}$ alpha olefin, based upon the total weight of the ethylene copolymer,
wherein (a) and (b) are based upon the total weight of the polypropylene composition and
wherein (b1), (b2), and (b3) are based upon the total weight of the recycled composition (b).

The features of the components forming the polypropylene composition are not inextricably linked to each other. In some embodiments, a level of a feature does involve the same level of the remaining features of the same or different components. In some embodiments, any component (a) to (b3) and any range of features of components (a) to (b3) is combined with any range of one or more of the features of components (a) to (b3) and with any possible additional component and the component's features.

In some embodiments, component (a) is a propylene homopolymer, a random copolymer of propylene containing up to 7 wt %, based upon the total weight of the copolymer, or a random terpolymer of propylene containing ethylene and up to 4 wt % of a $C_4$-$C_{10}$ α-olefin, based upon the total weight of the terpolymer. In some embodiments, the $C_4$-$C_{10}$ α-olefin is selected from the group consisting of 1-butene, 1-pentene, 1-hexene, 4-methyl-1-pentene and 1-octene. In some embodiments, the $C_4$-$C_{10}$ α-olefin is 1-butene. In some embodiments, component (a) is a virgin resin. In some embodiments, the random copolymer of propylene contains 0.2 to 6 wt % of ethylene, based upon the total weight of the copolymer. In some embodiments, the terpolymer of propylene contains up to 6 wt %, alternatively from 1 to 5 wt %, of the $C_4$-$C_{10}$ α-olefin, based upon the total weight of the terpolymer.

In some embodiments, component (a) has a content of polymer fraction which is insoluble in xylene at room temperature of not less than 80 wt %, alternatively not less than 85 wt %, alternatively not less than 90 wt %. In some embodiments and for propylene homopolymers, the content of polymer which is insoluble in xylene at room temperature is not less than 90 wt %, not less than 95 wt %, alternatively not less than 97 wt %.

In some embodiments, the melt flow rate (ISO 1133 230° C./2.16 kg) of component (a) ranges from 0.5 to 3 g/10 min, alternatively from 1 to 3 g/10 min.

In some embodiments, the melting temperature of component (a) ranges from 135 to 165° C. In some embodiments, component (a) is a homopolymer, having a melting temperature, determined via DSC, ranging from 155 to 165° C. In some embodiments, component (a) is a copolymer, having a melting temperature, determined via DSC, ranging from 135 to 155° C.

In some embodiments, component (a) is prepared by polymerizing propylene, optionally in mixture with ethylene and $C_4$-$C_{10}$ α-olefin, in the presence of a catalyst made from or containing a product of the reaction between:

i) a solid catalyst component made from or containing Ti, Mg, $C_1$, and an internal electron donor compound;

ii) an alkylaluminum compound and, iii) an external electron-donor compound having the formula:

$(R^7)_a(R^8)_b Si(OR^9)_c$, where a and b are integers from 0 to 2, c is an integer from 1 to 4 and the sum (a+b+c) is 4; $R^7$, $R^8$, and $R^9$, are alkyl, cycloalkyl or aryl radicals with 1-18 carbon atoms optionally containing heteroatoms.

In some embodiments, the internal donor is selected from the esters of mono or dicarboxylic organic acids such as benzoates, malonates, phthalates, and certain succinates. In some embodiments, the internal donors are as described in U.S. Pat. No. 4,522,930A, European Patent No. 045977A2, and Patent Cooperation Treaty Publication Nos. WO 00/63261 and WO 01/57099. In some embodiments, the internal donor is selected from the group consisting of phthalic acid esters and succinate acids esters. In some embodiments, the internal donor is an alkylphthalate. In some embodiments, the alkylphthalate is selected from the group consisting of diisobutyl phthalate, dioctyl phthalate, diphenyl phthalate, and benzyl-butyl phthalate.

In some embodiments, the particles of solid component (i) have substantially spherical morphology and an average diameter ranging between 5 and 150 μm, alternatively from 20 to 100 μm, alternatively from 30 to 90 μm. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30 wt %, alternatively from to 25 wt %.

In some embodiments, the amount of Ti ranges from 0.5 to 7 wt %, alternatively from to 5 wt %.

In some embodiments, the solid catalyst component (i) is prepared by reacting a titanium compound of formula Ti(OR)q-yXy, where q is the valence of titanium and y is a number between 1 and q with a magnesium chloride deriving from an adduct of formula MgCl2·pROH, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with Ti compound or subjected to thermal controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the treatment with $TiCl_4$ is carried out one or more times. In some embodiments, the electron donor compound is added during the treatment with $TiCl_4$.

In some embodiments, the alkyl-Al compound (ii) is selected from the group consisting of trialkyl aluminum compounds, alkylaluminum halides, alkylaluminum hydrides, and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichloride selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is higher than 1, alternatively ranges between 50 and 2000.

In some embodiments, the silicon compounds (iii) are wherein a is 1, b is 1, c is 2, at least one of $R^7$ and $R^8$ is selected from branched alkyl, cycloalkyl or aryl groups with 3-10 carbon atoms optionally containing heteroatoms and R9 is a C1-C10 alkyl group. In some embodiments, R9 is methyl. In some embodiments, the silicon compounds are selected from the group consisting of methylcyclohexyldimethoxysilane (C donor), diphenyldimethoxysilane, methyl-t-butyl dim ethoxy silane, dicyclopentyldimethoxysilane (D donor), diisopropyldimethoxysilane, (2-ethylpiperidinyl)t-butyldimethoxysilane, (2-ethylpiperidinyl) thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds are wherein a is 0, c is 3, R8 is a branched alkyl or cycloalkyl group, optionally containing heteroatoms, and R9 is methyl. In some embodiments, the silicon compounds are selected from the group consisting of cyclohexyltrimethoxysilane, t-butyltrimethoxysilane, and thexyltrimethoxysilane.

In some embodiments, the external electron donor compound (iii) is used in such an amount to give a molar ratio between the alkylaluminum compound and the external electron donor compound (iii) of from 0.1 to 200, alternatively from 1 to 100, alternatively from 3 to 50.

In some embodiments, the polymerization process is carried out in gas-phase, operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene.

In some embodiments, component (b) origins from post-consumer waste (Post-CW) or from pre-consumer waste (Pre-CW). In some embodiments, component (b) origins from Pre-CW. As used herein, the term "pre-consumer plastic" refers to a plastic waste diverted from a manufacturing process which is not reutilized such as rework, regrind or scrap, and is not reincorporated in the same process that generated the plastic waste.

In some embodiments, component (b1) is a random copolymer of propylene containing from 1 to 6 wt %, alternatively 2 to 5 wt %, of ethylene, based upon the total weight of component (b1). In some embodiments, component (b1) derives from pre-consumer random PP material.

In some embodiments, component (b2) is selected from the group consisting of SBS and SEBS rubbers which are (partly) hydrogenated styrene-(ethylene-butadiene)-styrene block copolymers. These polymers are triblock copolymers, having styrene at both extremities of the polymer chain with an internal polybutadiene, ethylene/butadiene, polyisoprene or hydrogenated polybutadiene, or polyisoprene block.

In some embodiments, SBC copolymers are obtained via anionic polymerization. In some embodiments, SBC copolymers are commercially available under the tradenames of Kraton and Tuftec, including Kraton SEBS G1657MS. In some embodiments, component (b2) is derived from a pre-consumer source.

In some embodiments, component (b3) is present in an amount ranging from 1 to 5 wt %, alternatively from 2 to 4 wt %, based upon the total weight of the recycled composition. In some embodiments, component (b3) is an ethylene polymer containing up to 30 wt %, alternatively up to 20 wt %, alternatively up to 15 wt %, of a $C_3$-$C_{10}$ alpha olefin, based upon the total weight of component (b3). In some embodiments, the alpha olefin is selected from the group consisting of butene-1, hexene-1, and octene-1.

In some embodiments, the ethylene polymer is selected from the group consisting of LDPE, LLDPE, VLDPE, and polyolefin elastomers (POE) of pre-consumer source.

In some embodiments, the melt flow rate (ISO 1133 230° C./2.16 kg) of component (b) ranges from 0.5 to 30 g/10 min, alternatively from 1 to 25 g/10 min, alternatively from 2 to 20 g/10 min.

In some embodiments, component (b) has a tensile modulus lower than 500 MPa, alternatively lower than 400 MPa.

In some embodiments, component (b) has a Charpy impact strength at 23° C. of 50-100 kJ/m², alternatively between 55-80 kJ/m². In some embodiments, the Charpy impact strength at −30° C. ranges from 5 to 20 kJ/m², alternatively between from 6 to 15 kJ/m².

In some embodiments, component (b) exhibits an elongation at break equal to or higher than 400%, alternatively in the range 500-600%.

In some embodiments, the melting temperature of component (b) ranges from 140 to 160° C., alternatively from 145 to 155° C.

In some embodiments, the final melt flow rate (ISO 1133 230° C./2.16 kg) of the polypropylene composition ranges from 0.1 to 5 g/10 min, alternatively from 0.5 to 3 g/10 min.

In some embodiments, the polypropylene composition is further made from or containing between 0.05-10 wt %, alternatively 0.1-8 wt %, of additives, based upon the total weight of the polypropylene composition.

In some embodiments, the additives are selected from the group consisting of stabilizers, peroxides, calcium oxides (CaO), colorants, nucleants, clarifiers, and stripping agents.

In some embodiments, the additive is a stabilizer added in a masterbatch. In some embodiments, the masterbatch is Tosaf ME 833848, which is a blend of about 70 wt % LDPE, based upon the total weight of the masterbatch, with a phenolic stabilizer (Irganox B225) and an Irgafos. In some embodiments, the masterbatch is added in an amount between 0.2 and 1.5 wt %, alternatively between 0.3 and 1.2 wt %, based upon the total weight of the polypropylene composition.

In some embodiments, the additive is a peroxide and added in the form of an organic compound or a masterbatch.

In some embodiments, the peroxide is selected from the group of Zebraflow T028, Zebraflow T0214, and Zebraflow T0318, which are masterbatches of a peroxide with a polyolefin. In some embodiments, the peroxide amounts to 2-10 wt % of the additive package, based upon the total weight of the additive package.

In some embodiments, the additive is CaO, thereby inhibiting the release of HCl. In some embodiments, the CaO is added as a masterbatch. In some embodiments, the masterbatch is made from or containing LDPE. In some embodiments, CaO added in a range between 0-2 wt %, based upon the total weight of the polypropylene composition.

In some embodiments, the additive is a black colorant. In some embodiments, the black colorant is added to the polypropylene composition in an amount between 0.1-5 wt %, alternatively between 1-2 wt %, based upon the total weight of the polypropylene composition, in the form of a masterbatch blend.

As described herein, stripping agents are compounds used to remove volatiles during processing of the polypropylene composition. In some embodiments, the stripping agent is commercially available under the tradename BYK 4200.

In some embodiments, the additive package ranges from 0.5 to 7 wt %, alternatively from 1 to 6 wt %, based on the total amount of the polypropylene composition.

In some embodiments, the polypropylene composition consists of:

(a) from 45 to 90 wt %, alternatively 50 to 85 wt %, alternatively 55-80 wt %, of a propylene polymer optionally containing up to 7 wt % of ethylene, based upon the total weight of the propylene polymer, and having a melt flow rate (ISO 1133 230° C./2.16 kg) ranging from 0.5 to 5 g/10 min;

(b) from 10 to 55 wt %, alternatively from 15 to 50 wt %, alternatively from 20 to 45%, of a recycled composition containing:

(b1) at least 70 wt %, alternatively from 75 to 90 wt %, of a propylene polymer containing from 1 to 7 wt % of ethylene, based upon the total weight of the propylene polymer;

(b2) from 5 to 30 wt %, alternatively from 7 to 25 wt %, of a styrenic block copolymer (SBC) and, (b3) from 1 to 5 wt %, alternatively from 2 to 4 wt %, of an ethylene homopolymer or copolymer containing up to 30 wt % of a $C_3$-$C_{10}$ alpha olefin, based upon the total weight of the ethylene copolymer, wherein (b1), (b2), and (b3) are based upon the total weight of the recycled composition (b); and (c) from 0.05-10 wt %, alternatively 0.1-8 wt %, of additives, wherein (a), (b), and (c) are based on the total weight of the polypropylene composition.

In some embodiments, the polypropylene composition has a tensile modulus ranging between 800-1400 MPa, alternatively between 870-1200 MPa.

In some embodiments, the polypropylene composition has a Charpy impact strength at 23° C. of 50-100 kJ/m², alternatively between 60-90 kJ/m². In some embodiments, the Charpy impact strength at 0° C. ranges from 5 to 20 kJ/m², alternatively between from 6 to 15 kJ/m².

In some embodiments, the polypropylene composition exhibits a stress at yield equal to or higher than 15 MPa, an elongation at break equal to or higher than 500%, alternatively higher than 550%, alternatively equal to or higher than 580%.

In some embodiments and in terms of optical properties the polypropylene composition shows a haze level below 30%, alternatively below 25%, alternatively below 20%.

In some embodiments, the polypropylene composition is obtained by mechanical blending of components (a)-(b) and optionally further components and additives.

In some embodiments, the process of making the polypropylene composition use a co-rotating twin screw tandem extruder to which the components (a-b) and optionally further components and additives are added.

In some embodiments, the additives are added in a reclaim extruder (first extruder) and a compounding extruder (second extruder) of a tandem extruder.

In some embodiments, the polypropylene composition is prepared in granule or flake form, for use in manufacturing articles.

In some embodiments, the polypropylene composition is used in the manufacturing of extruded or thermoformed articles. In some embodiments, the polypropylene polymer composition is used for manufacturing blow molded articles, alternatively bottles. In some embodiments, the present disclosure provides an article of manufacture made from or containing the polypropylene composition. In some embodiments, the article is selected from the group consisting of extruded articles and thermoformed articles. In some embodiments, the article is blow-molded.

The following examples are given to illustrate, but not limit the present disclosure.

EXAMPLES

Characterizations

Xylene-Soluble (XS) Fraction at 25° C.

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured into a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%); XS of components B) and C) were calculated by using the formula:

$$XStot = WaXSA + WbXSB + WcXSC$$

wherein Wa, Wb and We were the relative amount of components A, B and C, respectively, and (A+B+C=1).

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine $[\eta]$.

Ethylene ($C_2$) Content

$^{13}$C NMR of Propylene/Ethylene Copolymers

$^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal standard at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD, thereby removing 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with 6-titanium trichloride-diethylaluminum chloride" M. Kakugo, Y. Naito, K. Mizunuma and T. Miyatake, Macromolecules, 1982, 15, 1150) using the following equations:

$$PPP = 100 \; T_{\beta\beta}/S \quad PPE = 100 \; T_{\beta\delta}/S \quad EPE = T_{\delta\delta}/S$$

$$PEP = 100 \; S_{\beta\beta}/S \quad PEE = 100 \; S_{\beta\delta}/S \quad EEE = 100(0.25 \; S_{\gamma\delta} + 0.5 \; S_{\delta\delta})/S$$

$$S = T_{\beta\beta} + T_{\beta\delta} + T_{\delta\delta} + S_{\beta\beta} + S_{\beta\delta} + 0.25S_{\gamma\delta} + 0.5S_{\delta\delta}$$

The molar percentage of ethylene content was evaluated using the following equation:

$$E\% \; mol = 100*[PEP + PEE + EEE]$$

The weight percentage of ethylene content was evaluated using the following equation:

$$E \% \text{ wt.} = \frac{100 * E \% \text{ mol} * \text{MW}_E}{E \% \text{ mol} * \text{MW}_E + P \% \text{ mol} * \text{MW}_P}$$

where $P \%$ mol is the molar percentage of propylene content, while $\text{MW}_E$ and $\text{MW}_P$ are the molecular weights of ethylene and propylene, respectively.

The product of reactivity ratio $r_1 r_2$ was calculated according to Carman (C. J. Carman, R. A. Harrington and C. E. Wilkes, Macromolecules, 1977; 10, 5361 as:

$$r_1 r_2 = 1 + \left( \frac{EEE + PEE}{PEP} + 1 \right) - \left( \frac{P}{E} + 1 \right) \left( \frac{EEE + PEE}{PEP} + 1 \right)^{0.5}$$

The tacticity of Propylene sequences was calculated as mm content from the ratio of the PPP $\text{mmT}_{\beta\beta}$ (28.90-29.65 ppm) and the whole $\text{T}_{\beta\beta}$ (29.80-28.37 ppm).

Samples for the Mechanical Tests

Samples were obtained according to ISO 1873-2:2007.

Charpy impact test was determined according to ISO 179-1eA, and ISO 1873-2

Elongation at yield: measured according to ISO 527.

Elongation at break: measured according To ISO 527

Stress at break: measured according to ISO 527.

Tensile Modulus according to ISO 527-2,

Melting Point and Crystallization Point

The melting point was measured by using a DSC instrument according to ISO 11357-3, at scanning rate of 20 C/min both in cooling and heating, on a sample of weight between 5 and 7 mg., under inert $N_2$ flow. Instrument calibration made with Indium.

DBTT (Ductile to Brittle Transition Temperature)

Measured via a biaxial impact test with an impact tester equipped with the following features:

Load cell with natural frequency equal to or greater than 15,000 Hz

Capability to impact with a nominal energy of 16J approx. (5.3 Kg mass*30 cm falling height)

Hemispheric impactor ½" diameter

Specimen support 38 mm diameter

Capability to integrate Force/Time curve

DBTT Test Description:

Ten (10) 1.55*38 mm injection molded specimens were impacted at several different temperatures to determine the 3 temperatures at which a ratio of 20-80%, 40-60%, 80-20%, respectively, of Brittle/Ductile failures occurs.

As Brittle failure is intended as a failure absorbing a total energy equal to or lower than 2 Joules, the interpolation curve was traced between the previously-determined 3 temperatures. The temperature where the event of 50% Brittle and 50% Ductile failures occurs represents the DBTT.

Haze Determination

Films with a thickness of 50 μm were prepared by extruding the test composition in a single screw Collin extruder (length/diameter ratio of screw 1:25) at a film drawing speed of 7 m/min and a melt temperature do 210-250° C.

The haze value was measured using a Gardner photometric unit connected to a Hazemeter type UX-10 or an equivalent instrument having G. E. 1209 light source with filter "C". Standards were used for calibrating the instrument according to ASTM D1003.

EXAMPLES

Extrusion products and injection-molded articles are produced and assessed following IS019069-2:2016, 150294-1: 2017 and IS0294-3:2002.

Example 1

Into a twin screw extruder (Werner-type extruder), the following components were introduced: (a) 60 wt % of a virgin propylene homopolymer having a MFR 0.8 g/10 min and (b) 40 wt % of a recycled composition having a MFR of 4.3 g/10 min and made from or containing (b1) 80 wt % of a recycled random propylene ethylene copolymer containing 4.5 wt % of ethylene, based upon the total weight of the propylene copolymer, (b2) 15 wt % of recycled SEBS, and (b3) 5 wt % of recycled LLDPE, wherein (b1), (b2), and (b3) are based upon the total weight of the recycled composition (b).

The polymer portion is mixed with an additive package (Irgafos 168/Irganox 1010) and Millad 3988 clarifying agent (1800 ppm) and then extruded under nitrogen atmosphere, at a rotation speed of 250 rpm and a melt temperature of 200-250° C.

Comparative Example 1

Comparative example 1 was prepared similar to example 1, except only virgin polypropylene was used.

Comparative Example 2

Comparative example 2 was prepared similar to example 1, except the composition consisting of the recycled composition (component b) was used.

Comparative Example 3

Comparative example 3 was prepared similar to example 1, except 100 wt % of a virgin random propylene copolymer having a melt flow rate of 1.8 g/10 min and an ethylene content of 4 wt %, based upon the total weight of the propylene copolymer, was used.

Comparative Example 4

Comparative example 4 was prepared similar to example 1, except 40 wt % of virgin random propylene copolymer having a melt flow rate of 0.3 g/10 min and an ethylene content of 4 wt %, based upon the total weight of the propylene copolymer, was mixed with 50 wt % of recycled PP having MFR of 16 g/10 min and 10 wt % of the compatibilizer composition HCl described as component (B) in Patent Cooperation Treaty Publication No. WO2007/071494. The weight percentages of the virgin random propylene copolymer, the recycled PP, and the compatibilizer composition were based on the total weight of comparative example 4.

Example 5

Example 5 was prepared similar to in example 1, except example 5 was made from or containing 80% of a virgin propylene random copolymer (component (a)) having a melt flow rate of 1.8 and an ethylene content of 3 wt %, based upon the total weight of the propylene copolymer, and 20 wt % (component b) of a recycled composition, having a MFR of 4.3 g/10 min, and made from or containing (b1) 85 wt % of a recycled random propylene ethylene copolymer containing 4.5 wt % of ethylene, based upon the total weight of the recycled copolymer, (b2) 8 wt % of recycled SEBS, and (b3) 7 wt % of recycled LLDPE, wherein (b1), (b2), and (b3) are based upon the total weight of the recycled composition (b).

The polymer portion was mixed with an additive package (Irgafos 168/Irganox 1010) and Millad 3988 clarifying agent (1800 ppm) and then extruded under nitrogen atmosphere, at a rotation speed of 250 rpm and a melt temperature of 200-250° C.

Example 6

Example 6 was prepared similar to example 1, except the composition was made from or containing 70% of component (a) and 30% of component (b).

Comparative Example 7

Comparative example 7 was prepared similar to example 5, except the composition was made from or containing 100% of component (a).

TABLE 1

| Properties of the final compositions | | | | | | | | | | |
|---|---|---|---|---|---|---|---|---|---|---|
| | | Examples | | | | | | | | |
| | | 1 | C1 | C2 | C3 | C4 | 5 | 6 | C7 |
| MFR, g/10 min | | 1.8 | 0.8 | 4.3 | 1.8 | 1.9 | 2.2 | 2.4 | 1.8 |
| Tensile Modulus, MPa | | 990 | — | 290 | 850 | 900 | 870 | 820 | 970 |
| Elongation at break, % | | 690 | 400 | 570 | 350 | 520 | 640 | 590 | 280 |
| Tm, ° C. | | 162 | 162 | 150 | 147 | 157 | 149 | 150 | 149 |
| DBTT ° C. | | — | >23 | — | >10 | | 4 | −4 | >20 |
| Haze, % | | 17 | 35 | — | 11 | >80 | 10 | 12 | 10 |
| Charpy kJ/m² | at 23° C. | 75 | — | 59 | 45 | 52 | 48 | 55 | 27 |
| | at 0° C. | 8 | — | — | 4 | 7 | 4 | 6 | 3.5 |
| | at −20° C. | — | — | 71 | — | — | — | — | — |

What is claimed is:

1. A polypropylene composition comprising:
   (a) from 45 to 90 wt % of a propylene polymer optionally containing up to 7 wt % of ethylene, based upon the total weight of the propylene polymer, and having a melt flow rate, ISO 1133 230° C./2.16 kg, ranging from 0.5 to 5 g/10 min; and
   (b) from 10 to 55 wt % of a recycled composition containing:
   (b1) at least 70 wt % of a propylene polymer containing from 1 to 7 wt % of ethylene, based upon the total weight of the propylene polymer;
   (b2) from 5 to 30 wt % of a styrenic block copolymer (SBC) and,
   (b3) from 1 to 5 wt % of an ethylene homopolymer or copolymer containing up to 30 wt % of a $C_3$-$C_{10}$ alpha olefin, based upon the total weight of the ethylene copolymer,
   wherein (a) and (b) are based upon the total weight of the polypropylene composition and wherein (b1), (b2), and (b3) are based upon the total weight of the recycled composition (b).

2. The polypropylene composition according to claim 1, wherein:
   component (a) ranges from 50 to 85 wt %; and
   component (b) ranges from 15 to 50 wt %.

3. The polypropylene composition according to claim 1, wherein component (a) is a random copolymer of propylene containing from 0.2 to 6 wt % of ethylene, based upon the total weight of the copolymer.

4. The polypropylene composition according to claim 1, wherein component-(a) has a content of polymer fraction which is insoluble in xylene at 25° C. of not less than 80 wt %.

5. The polypropylene composition according to claim 1, wherein component (a) has a melt flow rate, ISO 1133 230° C./2.16 kg, ranging from 0.5 to 3 g/10 min.

6. The polypropylene composition according to claim 1, wherein component (b) origins from pre-consumer waste.

7. The polypropylene composition according to claim 1, wherein component (b1) is a random copolymer of propylene containing from 1 to 6 wt % of ethylene, based upon the total weight of component (b1).

8. The polypropylene composition according to claim 1, wherein component (b2) is selected from the group consisting of SBS and SEBS rubbers.

9. The polypropylene-composition according to claim 1, wherein component (b3) is an ethylene polymer containing up to 30 wt % of a $C_3$-$C_{10}$ alpha olefin, based upon the total weight of component (b3).

10. The polypropylene-composition according to claim 1, wherein a melt flow rate, ISO 1133 230° C./2.16 kg, of component (b) ranges from 0.5 to 30 g/10 min.

11. The polypropylene composition according to claim 1, wherein component (b) has a tensile modulus lower than 500 MPa, measured according to ISO 527-2.

12. The polypropylene composition according to claim 1, wherein a melt flow rate, ISO 1133 230° C./2.16 kg, of the polypropylene composition ranges from 0.1 to 5 g/10 min.

13. The polypropylene composition according to claim 1 having a tensile modulus ranging between 800-1400 MPa, a Charpy impact strength at 23° C. measured in accordance with ISO 179-1eA, and ISO 1873-2, ranging from 50-100 kJ/m², a stress at yield, measured in accordance with ISO 1527-2, equal to or higher than 15 MPa, an elongation at break, measured in accordance with ISO 1527-2, equal to, or higher than, 550%, and a haze level below 30%.

14. An article manufacture comprising the polypropylene composition of claim 1 and selected from the group consisting of extruded articles and thermoformed articles.

15. An article manufacture comprising the polypropylene composition of claim 1 and being a blow-molded article.

* * * * *